(12) United States Patent
Tang et al.

(10) Patent No.: US 11,741,728 B2
(45) Date of Patent: Aug. 29, 2023

(54) KEYPOINT MATCHING USING GRAPH CONVOLUTIONS

(71) Applicant: TOYOTA RESEARCH INSTITUTE, INC., Los Altos, CA (US)

(72) Inventors: Jiexiong Tang, Stockholm (SE); Rares Andrei Ambrus, San Francisco, CA (US); Jie Li, Mountain View, CA (US); Vitor Guizilini, Santa Clara, CA (US); Sudeep Pillai, Santa Clara, CA (US); Adrien David Gaidon, Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 115 days.

(21) Appl. No.: 17/231,905

(22) Filed: Apr. 15, 2021

(65) Prior Publication Data

US 2021/0326601 A1    Oct. 21, 2021

Related U.S. Application Data

(60) Provisional application No. 63/010,443, filed on Apr. 15, 2020.

(51) Int. Cl.
*G06V 10/82* (2022.01)
*G06V 20/64* (2022.01)
(Continued)

(52) U.S. Cl.
CPC ........... *G06V 20/64* (2022.01); *G05D 1/0221* (2013.01); *G05D 1/0246* (2013.01); *G06F 18/22* (2023.01);
(Continued)

(58) Field of Classification Search
CPC .... G06V 20/56; G06V 10/761; G06V 10/751; G06V 10/82; G06T 7/74; G06T 2207/10024; G06T 2207/30252
See application file for complete search history.

(56) References Cited

U.S. PATENT DOCUMENTS 9,008,424 B2 * 4/2015 Cordara ............... G06V 10/757
 382/170
11,087,479 B1 * 8/2021 Geraghty ................ G06T 17/00
(Continued)

FOREIGN PATENT DOCUMENTS

CN         109359534 A      2/2019

OTHER PUBLICATIONS

Sarlin, et al., "SuperGlue: Learning Feature Matching with Graph Neural Networks", arXiv:1911:11763, CVPR, 2020.
(Continued)

*Primary Examiner* — Ian L Lemieux
(74) *Attorney, Agent, or Firm* — Seyfarth Shaw LLP

(57) ABSTRACT

A method for keypoint matching includes determining a first set of keypoints corresponding to a current environment of the agent. The method further includes determining a second set of keypoints from a pre-built map of the current environment. The method still further includes identifying matching pairs of keypoints from the first set of keypoints and the second set of keypoints based on geometrical similarities between respective keypoints of the first set of keypoints and the second set of keypoints. The method also includes determining a current location of the agent based on the identified matching pairs of keypoints. The method further includes controlling an action of the agent based on the current location.

20 Claims, 7 Drawing Sheets

(51) Int. Cl.

| | | |
|---|---|---|
| | *G05D 1/02* | (2020.01) |
| | *G06T 7/73* | (2017.01) |
| | *G06V 20/56* | (2022.01) |
| | *G06V 10/75* | (2022.01) |
| | *G06V 10/74* | (2022.01) |
| | *G06F 18/22* | (2023.01) |
| | *G06V 10/762* | (2022.01) |
| | *G06V 10/764* | (2022.01) |

(52) U.S. Cl.
CPC ............. *G06T 7/74* (2017.01); *G06V 10/751* (2022.01); *G06V 10/761* (2022.01); *G06V 10/763* (2022.01); *G06V 10/764* (2022.01); *G06V 10/82* (2022.01); *G06V 20/56* (2022.01); *G06T 2207/10024* (2013.01); *G06T 2207/30252* (2013.01)

(56) References Cited

U.S. PATENT DOCUMENTS

| | | | | |
|---|---|---|---|---|
| 11,430,206 | B1* | 8/2022 | Papazov | G06T 7/11 |
| 2012/0011119 | A1* | 1/2012 | Baheti | G06K 9/6228 |
| | | | | 707/E17.014 |
| 2012/0011142 | A1* | 1/2012 | Baheti | G06V 10/462 |
| | | | | 707/769 |
| 2013/0182906 | A1* | 7/2013 | Kojo | G01C 11/06 |
| | | | | 382/103 |
| 2014/0010407 | A1* | 1/2014 | Sinha | G06V 20/10 |
| | | | | 382/103 |
| 2016/0379092 | A1* | 12/2016 | Kutliroff | G06N 3/084 |
| | | | | 382/158 |
| 2019/0019030 | A1* | 1/2019 | Cansizoglu | G06T 7/75 |
| 2019/0147341 | A1* | 5/2019 | Rabinovich | G06T 7/97 |
| | | | | 382/156 |
| 2019/0271549 | A1* | 9/2019 | Zhang | G05D 1/0246 |
| 2019/0332120 | A1* | 10/2019 | Choi | G01C 21/3848 |
| 2019/0392212 | A1 | 12/2019 | Sawhney et al. | |
| 2020/0306983 | A1* | 10/2020 | Noh | G01S 17/58 |
| 2020/0341466 | A1* | 10/2020 | Pham | G06N 3/088 |
| 2021/0190535 | A1* | 6/2021 | Tomioka | G05D 1/0246 |
| 2021/0201145 | A1* | 7/2021 | Pham | G06N 3/08 |
| 2021/0318140 | A1* | 10/2021 | Tang | G01C 21/3896 |
| 2021/0319236 | A1* | 10/2021 | Tang | G06V 20/56 |
| 2021/0373161 | A1* | 12/2021 | Lu | G06V 10/82 |

OTHER PUBLICATIONS

Brachmann, et al., "Neural-Guided RANSAC: Learning Where to Sample Model Hypotheses", arXiv:1905.4132, ICCV, 2019.

Yi, et al., "Learning to Find Good Correspondences", arXiv:1711.05971, Proceedings of the IEEE Conference on Computer Vision and Pattern Recognition (CVPR), 2018.

Sarlin, et al., "From Coarse to Fine: Robust Hierarchical Localization at Large Scale", arXiv:1812.03506, Proceedings of the IEEE Conference on Computer Vision and Pattern Recognition (CVPR), .2019.

Dusmanu, et al., D2-Net: A Trainable CNN for Joint Detection and Description of Local Features, arXiv:1905.03561, Proceedings of the IEEE Conference on Computer Vision and Pattern Recognition (CVPR), 2019.

Schonberger, et al., "Structure-from-Motion Revisited", Proceedings of the IEEE Conference on Computer Vision and Pattern Recognition (CVPR), 2016.

Arandjelovic, et al., "NetVLAND: CNN architecture for weakly supervised place recognition", Proceedings of the IEEE Conference on Computer Vision and Pattern Recognition (CVPR), 2016.

Tang, et al. Neural Outlier Rejection for Self-Supervised Keypoint Learning, arXiv:1912.10615, ICLR 2020.

Jiang, et al., "GLMNet: Graph Learning-Matching Networks for Feature Matching", arXiv:1911.07681, 2019.

Pan, et al., "3DTI-Net-Learn-Inner-Transform-Invariant-3D-Geometry-Features-Using-Dynamic-GCN", arXiv1812.06254, 2018.

Liu, et al., "Efficient Global 2D-3D Matching for Camera Localization in a Large-Scale 3D Map", 2017 IEEE International Conference on Computer Vision (ICCV), 2017.

* cited by examiner

KEYPOINT MATCHING USING GRAPH CONVOLUTIONS

CROSS-REFERENCE TO RELATED APPLICATION

The present application claims the benefit of U.S. Provisional Patent Application No. 63/010,443, filed on Apr. 15, 2020, and titled "LEARNING 3D-2D KEYPOINT MATCHING USING GRAPH CONVOLUTIONS," the disclosure of which is expressly incorporated by reference in its entirety.

FIELD

Aspects of the present disclosure generally relate to keypoint matching, and more particularly to techniques and apparatuses for three-dimensional scene reconstruction.

BACKGROUND

Keypoint matching may be used for image registration and localization. For example, a query image may be localized by matching keypoints of the query image with keypoints of images in a database. Conventional neural networks may be trained to match keypoints. In some examples, conventional systems may detect features and match detected features independent from certain geometric transformations, such as image translation, scale, and rotation. In some such examples, the conventional systems extract keypoints (e.g., characteristic points, feature points, or interest points) and generate a descriptor for each keypoint. The descriptor may be a string describing the keypoint. In such examples, the descriptor may be independent from geometric transformation. A machine-vision system may use one or both of the keypoints or descriptors to identify or track features in one or more images.

SUMMARY

In one aspect of the present disclosure, a method for keypoint matching includes determining a first set of keypoints corresponding to a current environment of the agent. The method further includes determining a second set of keypoints from a pre-built map of the current environment. The method still further includes identifying matching pairs of keypoints from the first set of keypoints and the second set of keypoints based on geometrical similarities between respective keypoints of the first set of keypoints and the second set of keypoints. The method also includes determining a current location of the agent based on the identified matching pairs of keypoints. The method further includes controlling an action of the agent based on the current location.

Another aspect of the present disclosure is directed to an apparatus for keypoint matching. The apparatus includes means for determining a first set of keypoints corresponding to a current environment of the agent. The apparatus further includes means for determining a second set of keypoints from a pre-built map of the current environment. The apparatus still further includes means for identifying matching pairs of keypoints from the first set of keypoints and the second set of keypoints based on geometrical similarities between respective keypoints of the first set of keypoints and the second set of keypoints. The apparatus also includes means for determining a current location of the agent based on the identified matching pairs of keypoints. The apparatus further includes means for controlling an action of the agent based on the current location.

In another aspect of the present disclosure, a non-transitory computer-readable medium with non-transitory program code recorded thereon for keypoint matching is disclosed. The program code is executed by a processor and includes program code to determine a first set of keypoints corresponding to a current environment of the agent. The program code further includes program code to determine a second set of keypoints from a pre-built map of the current environment. The program code still further includes program code to identify matching pairs of keypoints from the first set of keypoints and the second set of keypoints based on geometrical similarities between respective keypoints of the first set of keypoints and the second set of keypoints. The program code also includes program code to determine a current location of the agent based on the identified matching pairs of keypoints. The program code further includes program code to control an action of the agent based on the current location.

Another aspect of the present disclosure is directed to an apparatus having a memory, one or more processors coupled to the memory, and instructions stored in the memory and operable, when executed by the processor, to cause the apparatus to determine a first set of keypoints corresponding to a current environment of the agent. Execution of the instructions may further cause the apparatus to determine a second set of keypoints from a pre-built map of the current environment. Execution of the instructions may also cause the apparatus to identify matching pairs of keypoints from the first set of keypoints and the second set of keypoints based on geometrical similarities between respective keypoints of the first set of keypoints and the second set of keypoints. Execution of the instructions may still further cause the apparatus to determine a current location of the agent based on the identified matching pairs of keypoints. Execution of the instructions may also cause the apparatus to control an action of the agent based on the current location.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

The features, nature, and advantages of the present disclosure will become more apparent from the detailed

DETAILED DESCRIPTION

Figure 1:
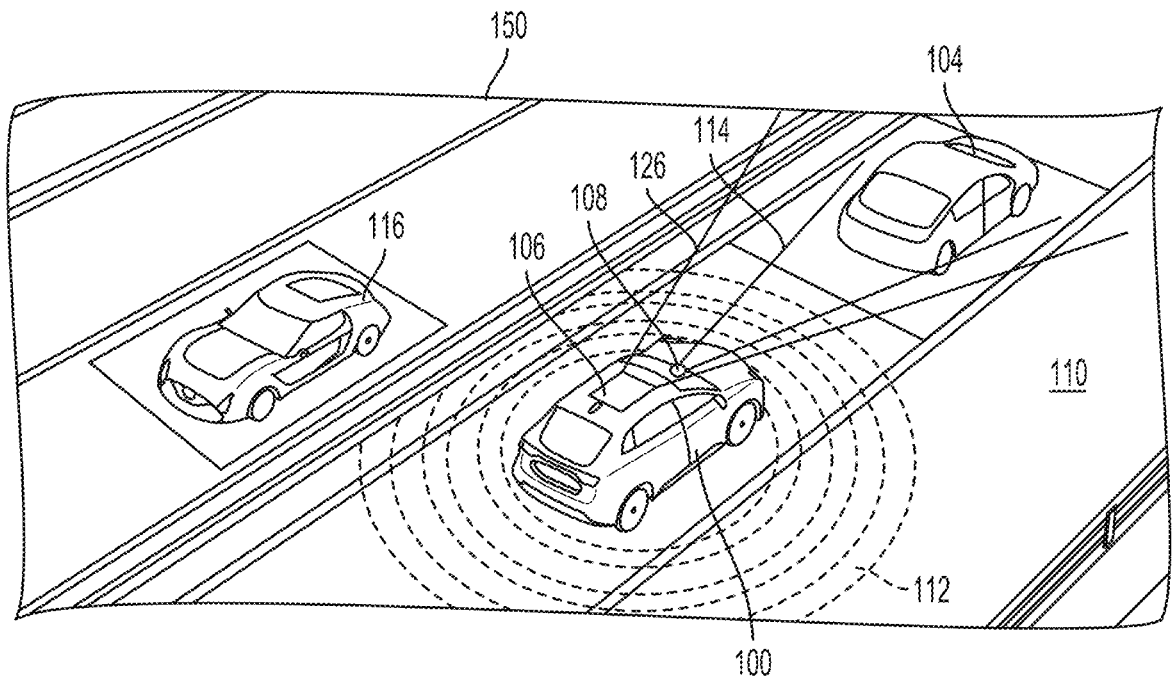
FIG. 1 illustrates an example of a vehicle in an environment according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

An agent, such as an autonomous agent, may reconstruct a three-dimensional map of a scene based on one or more images obtained from a sensor. The agent may also localize its location in an environment (e.g., a map of the environment) based on sensor information (e.g., GPS information). Localization and scene reconstruction may be used to perform various tasks, such as scene understanding, motion planning, and/or obstacle avoidance. For example, the agent may autonomously navigate through an environment based on the localization information and the scene reconstruction. Depth estimation may be used to understand (e.g., reconstruct) the structure of a scene.

Conventional machine-vision based systems, such as autonomous vehicles, may use a LIDAR sensor to build a 3D spatial representation of the world. The 3D spatial representation is localized against a pre-built 3D map. In such conventional systems, keypoint matching may be specified for localizing the 3D representation against the pre-built 3D map to reconstruct a three-dimensional map of a scene based on one or more images, such as 3D images, obtained from a sensor, such as a LIDAR sensor. That is, conventional keypoint matching systems match 3D keypoints obtained from a LIDAR sensor to 3D keypoints of the pre-built map.

In such conventional systems, keypoints may be matched based on one or more features of each keypoint as well as a similarity of keypoint descriptors. A keypoint descriptor may be a string determined based on features of an image obtained during an encoding process. In some examples, a keypoint in a target image may be matched with a keypoint in a query image based on a distance of corresponding keypoint descriptors in a descriptor space. That is, matching keypoints may be keypoints with a shortest distance in the descriptor space.

In some such conventional systems, two different images, such as a query image and a target image, of a same location may not be considered a match if one or more keypoint descriptors of the query image fail to match one or more descriptors of the target image. In some examples, keypoint descriptors may fail to match because a keypoint in the query image may be occluded. In some other examples, keypoint descriptors may fail to match because lighting and/or weather conditions may alter a keypoint or a corresponding keypoint descriptor in the query image. In still some other examples, keypoint descriptors may fail to match because an angle of the query image may be different from the angle of the target image. In such examples, the query image may be rotated 180o. It may be desirable to eliminate the use of keypoint descriptors when matching two or more images of a location.

Additionally, due to costs and accuracy, it may be desirable to match two-dimensional (2D) keypoints to three-dimensional (3D) keypoints of the pre-built map. Specifically, LIDAR sensors used for 3D keypoint matching may be costly, bulky, and resource-intensive. Additionally, the LIDAR sensor's accuracy may be reduced in some environments, such as, for example, rain, fog, wet surfaces, non-retroreflective road markings, etc. In contrast, a camera, such as a red-green-blue (RGB) camera, may provide both a dense semantic and spatial understanding of the scene by reasoning across space (stereo, multi-camera) and time (multi-view reconstruction). Additionally, a camera may be less costly, smaller, and less resource-intensive in comparison to LIDAR. Therefore, it may be desirable to use one or more cameras for a machine-vision system. More particularly, it may be desirable to use a single camera for 3D scene reconstruction based on 2D keypoint matching.

Aspects of the present disclosure are directed to descriptor-free matching of a query image to a target image. Particular implementations of the subject matter described in this disclosure can be implemented to realize one or more of the following potential advantages. In some examples, the descriptor-free matching may improve a training process because training images may be more similar to testing images when a keypoint descriptor is not considered. In some other examples, a keypoint matching system may place a greater emphasis on a spatial layout of features as opposed to their appearance. In some such examples, additional degrees of freedom may be included for each keypoint, such that additional information may be used to distinguish dynamic and/or occluded objects. Therefore, the keypoint matching system may match a 3D image to a 2D image. Additionally, the keypoint matching system may be more robust in view of changes to appearance, dynamic objects, and/or occluded objects.

As described, in some implementations, the keypoint matching system may match a 3D image to a 2D image. In such implementations, a 2D image, such as a monocular image, may be matched with a pre-built 3D map. In some such implementations, the LIDAR sensor may be replaced by a camera. Therefore, aspects of the present disclosure improve an accuracy of 3D representations of an environment based on one or more images obtained from a camera.

FIG. 1 illustrates an example of an ego vehicle 100 (e.g., ego agent) in an environment 150 according to aspects of the present disclosure. As shown in FIG. 1, the ego vehicle 100 is traveling on a road 110. A first vehicle 104 (e.g., other agent) may be ahead of the ego vehicle 100, and a second vehicle 116 may be adjacent to the ego vehicle 100. In this example, the ego vehicle 100 may include a 2D camera 108, such as a 2D RGB camera, and a second sensor 106. The second sensor 106 may be another RGB camera or another type of sensor, such as RADAR and/or ultrasound. Additionally, or alternatively, the ego vehicle 100 may include one or more additional sensors. For example, the additional sensors may be side facing and/or rear facing sensors.

In one configuration, the 2D camera 108 captures a 2D image that includes objects in the 2D camera's 108 field of view 114. The second sensor 106 may generate one or more output streams. The 2D image captured by the 2D camera includes a 2D image of the first vehicle 104, as the first vehicle 104 is in the 2D camera's 108 field of view 114.

The information obtained from the sensors 106, 108 may be used to navigate the ego vehicle 100 along a route when the ego vehicle 100 is in an autonomous mode. The sensors 106, 108 may be powered from electricity provided from the vehicle's 100 battery (not shown). The battery may also power the vehicle's motor. The information obtained from the sensors 106, 108 may be used for keypoint matching.

Place recognition refers to localizing an image in a pre-built map. In most systems, given a set of database images collected offline, learned keypoints and descriptors may be used to generate a globally consistent map. During online localization, a conventional system may obtain the top-K matching images from the database in response to a query image obtained from one or more sensors. Given the top-K matches, a set of corresponding sparse points from the pre-built map may be aligned with the query image.

Figure 2:
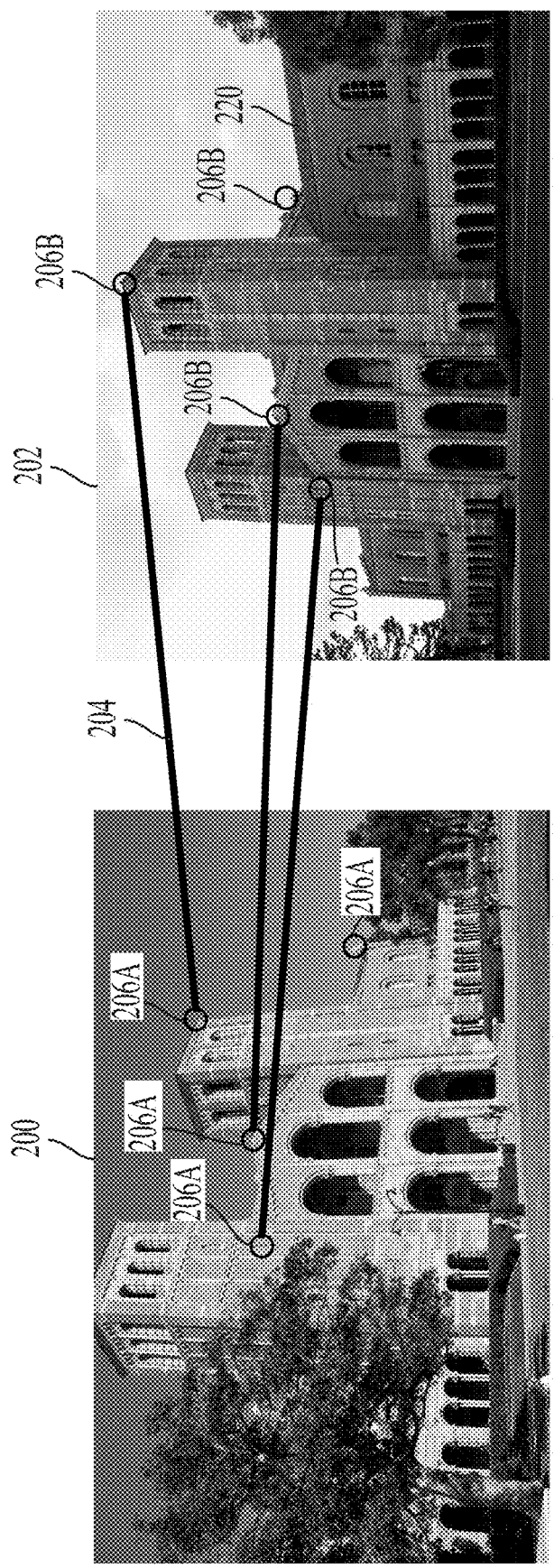
FIG. 2 is a diagram illustrating an example of matching keypoints in a query image and a target image, in accordance with aspects of the present disclosure.

FIG. 2 is a diagram illustrating an example of matching keypoints 206A and 206B in a query image 200 and a target image 202, in accordance with aspects of the present disclosure. In the example of FIG. 2, the target image 202 may be retrieved as a matching image associated with the query image 200 based on a number of keypoints 206A and corresponding keypoint descriptors in the query image 200 that match keypoints 206B and corresponding keypoint descriptors of the target image 202. In some examples, the target image 202 may be retrieved from a storage system, such as a memory device of the agent or a cloud-based storage system based on the number of keypoints 206A in the query image 200. The query image 200 may be unknown to the agent at a time when the image 200 is captured by a sensor of the agent.

As described, in some implementations, the query image 200 may be used for a search an image database. The search may be an example of a visual search of the image database. In some examples, the images in the image database may be geotagged. Additionally, in some examples, the images of the database may be associated with a 3D model, such as a sparse 3D model. That is, 3D keypoints of the 3D model of an environment may correspond to 2D keypoints of images stored in the image database.

In such implementations, locations of top-ranked images selected from the image database may be used as suggestions for a location of the query image 200. In some examples, an image extraction function produces a fixed size vector $f(I_i)$ given an image $I_i$, such as the query image 200. Specifically, the image extraction function may extract representations for the entire image database offline. At test time, the visual search is performed by finding a nearest database image to the query image 200 based on matching keypoints. In some examples, the image extraction function, or another module, may also extract features (e.g., keypoints) of the query image 200. The keypoints of the query image 200 may be matched with keypoints of one or more images in the image database.

In one configuration, the keypoints may be matched on a global scale and then a local scale. Additionally, the keypoints may be directly matched. In some implementations, the nearest database image may be found via a nearest neighbor search, by sorting images based on a Euclidean distance between an image of the database and the query image 200. In the example of FIG. 2, the target image 202 may be the nearest database image to the query image 200.

As described, in some such conventional systems, keypoints may also be matched based on one or more features of each keypoint as well as a similarity of keypoint descriptors. A keypoint descriptor may be a string determined based on features of an image obtained during an encoding process. In some examples, a keypoint in a target image may be matched with a keypoint in a query image based on a distance of corresponding keypoint descriptors in a descriptor space. That is, matching keypoints may be keypoints with a shortest distance in the descriptor space.

In some such conventional systems, two different images, such as a query image and a target image, of a same location may not be considered a match if one or more keypoint descriptors of the query image fail to match one or more descriptors of the target image. In some examples, keypoint descriptors may fail to match because a keypoint in the query image may be occluded. In some other examples, keypoint descriptors may fail to match because lighting and/or weather conditions may alter a keypoint or a corresponding keypoint descriptor in the query image. In still some other examples, keypoint descriptors may fail to match because an angle of the query image may be different from the angle of the target image. In such examples, the query image may be rotated 180o. It may be desirable to eliminate the use of keypoint descriptors when matching two or more images of a location.

Aspects of the present disclosure are directed to the descriptor-free matching of a query image to a target image. In some examples, the descriptor-free matching may improve a training process because training images may be more similar to testing images when a keypoint descriptor is not considered. In some other examples, a keypoint matching system may place a greater emphasis on a spatial layout of features as opposed to their appearance. In some such examples, additional degrees of freedom may be included for each keypoint, such that additional information may be used to distinguish dynamic and/or occluded objects. Therefore, the keypoint matching system may match a 3D image to a 2D image. Additionally, the keypoint matching system may be more robust in view of changes to appearance, dynamic objects, and/or occluded objects.

In some implementations, an agent, such as the ego vehicle 100 of FIG. 1, may generate a map of a surrounding environment based on the target image 202 retrieved from the image database. In some examples, a six degree of freedom (6-DoF) pose of the sensor may be estimated from the matched keypoints. Additionally, or alternatively, in some examples, a sparse 3D representation, such as a 3D map, of the agent's surrounding environment may be generated based on a pre-built map associated with the target image 202. The pre-built map may be stored in a memory of the agent and/or stored in a remote memory location, such as a cloud memory storage location. The 3D maps may be used for one or more tasks, such as localization, navigation, or another task.

In the example of FIG. 2, keypoints 206A and 206B that are matching between the query image 200 and the target image 202 are depicted using connector lines 204 between corresponding features. Connector lines 204 may connect a center of receptive fields for matching keypoints 206A and 206B. In the example of FIG. 2, the connector lines 204 are provided for illustrative purposes. A number of connector lines 204 may correspond to a number of matching keypoints. In some examples, during testing (e.g., real-world deployment), the connector lines 204 may not be generated between matched images 200 and 202.

Each keypoint 206A and 206B may correspond to a feature of an image 200 and 202. Thus, in some examples, a keypoint may be referred to as a feature. Additionally, as shown in FIG. 2, due to an angle of a sensor used for capturing an image, occlusion, and/or other factors, one or more keypoints 206A and 206B may not match. In some conventional systems, the query image 200 may not be considered a match of the target image 202 if one or more keypoints 206A and 206B do not match. In some aspects of the present disclosure, a constellation of keypoints 206A of the query image 200 may be matched with a constellation of keypoints 206B of the target image 202. That is, rather than finding one or more individually matching keypoints 206A and 206B, some aspects of the present disclosure match groups of keypoints 206A and 206B. Such group matching may remove ambiguities, such as occlusion or dynamic changes, that exist between individual corresponding keypoints 206A and 206B of different images 200 and 202.

In some implementations, a graph convolution model, such as an artificial neural network, may be trained to learn a matching function. In some such implementations, the matching function may be trained to match 3D keypoints of a 3D map, such as a sparse pre-built map, with 2D keypoints of an image, such as a 2D image captured by a monocular sensor of an agent. As described, in some such implementations, the matching function may match a constellation of 3D keypoints with a constellation of 2D keypoints.

Figure 3A:
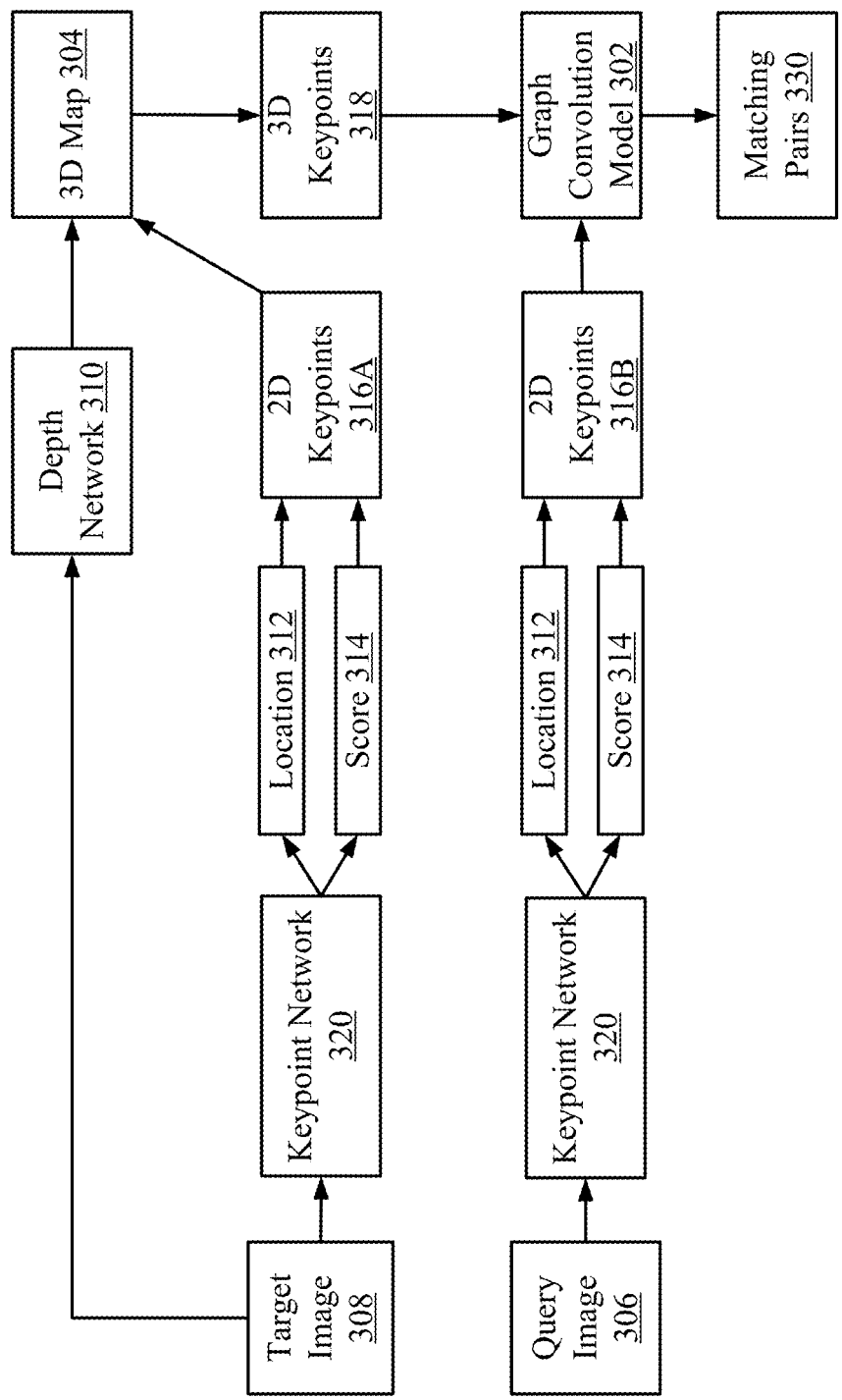
FIG. 3A is a block diagram illustrating an example of a keypoint matching system, in accordance with aspects of the present disclosure.

FIG. 3A is a block diagram illustrating an example of a keypoint matching system 300, in accordance with aspects of the present disclosure. In the example of FIG. 3A, the keypoint matching system 300 uses a graph convolution model 302 to match 3D keypoints of a 3D map 304 with 2D keypoints of a query image 306. The keypoint matching system 300 may be a component of an agent, such as the ego-vehicle 100 or the vehicle 428 of FIGS. 1 and 4, respectively. Additionally, the keypoint matching system 300 may be an example of the keypoint matching system 400 of FIG. 4. As shown in FIG. 3A, a query image 306 and a target image 308 may be input to a keypoint network 320. The query image 306 may also be referred to as a context image, such as a context image 306 of FIGS. 3B and 3C. The target image 308 may be identified based on a location associated with the query image 306 and/or other similar features of the query image 306. In some examples, if the 3D map 304 is generated from multiple images, the target image 308 may be a closest match to the query image 306. The matching may be based on external pose information from an external sensor, such as a location (e.g., GPS) sensor. In other examples, the matching may be based on matching descriptors associated with keypoints extracted from query image 306 and descriptors associated with keypoints from the 3D map 304.

Figure 4:
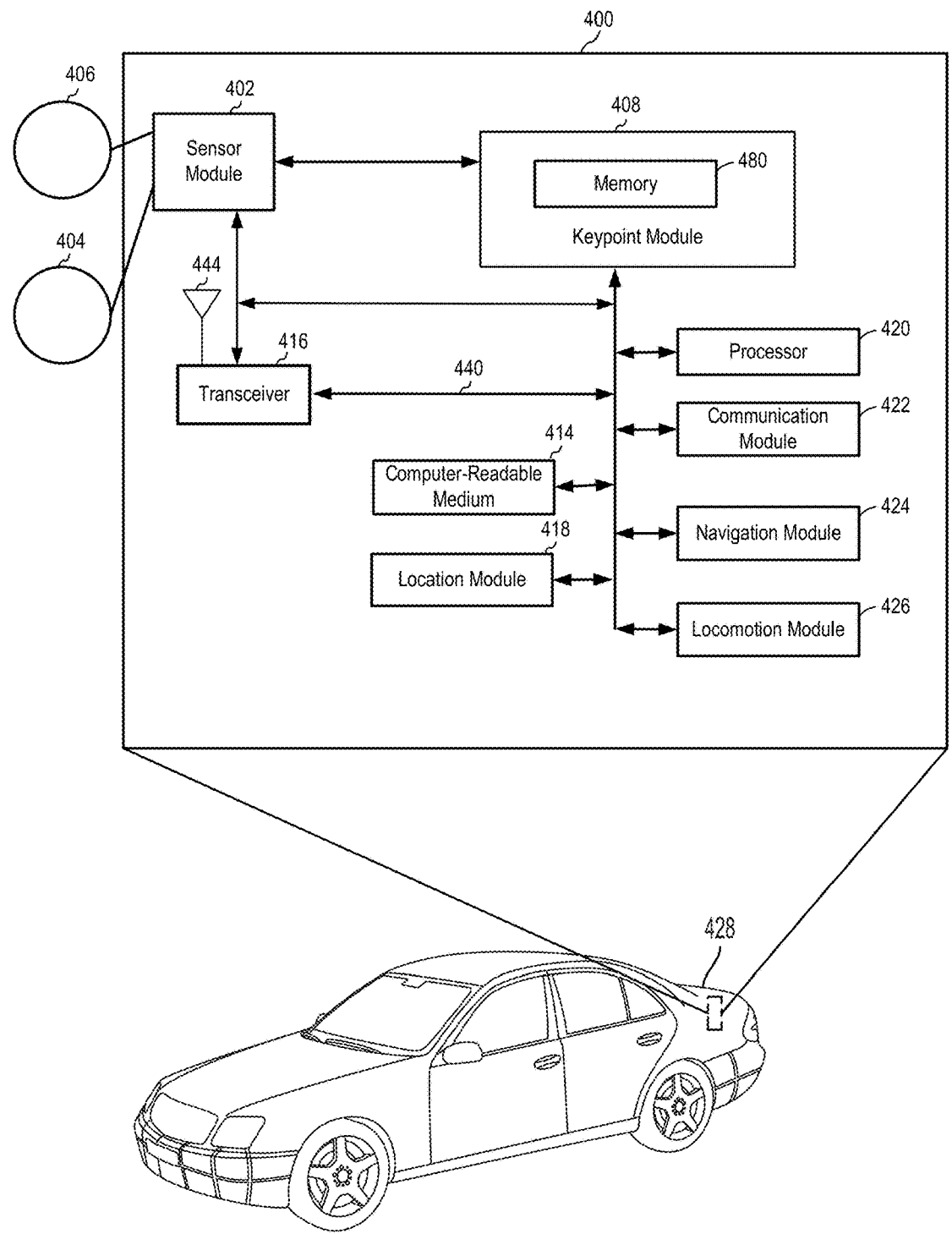
FIG. 4 is a diagram illustrating an example of a hardware implementation for a keypoint matching system, in accordance with aspects of the present disclosure.

The query image 306 may be obtained from a sensor, such as a monocular camera (e.g., RGB camera), integrated with an agent, such as the ego vehicle 100 or vehicle 428 of FIGS. 1 and 4. The target image 308 may be obtained from an image database, as described above with reference to FIG. 2. The target image 308 may be an example of the target image 202 of FIG. 2. Additionally, the query image 306 may be an example of the query image 200 of FIG. 2.

In the example of FIG. 3A, the query image 306 and the target image 308 may each be input to a keypoint network 320. In some implementations, the keypoint network 320 outputs keypoint scores 314 and keypoint locations 312 corresponding to an input image, such as the query image 306 or the target image 308. In some examples, the input image 306 and 308 may be a 2D image captured by a camera, such as a monocular camera, integrated with an agent, such as an autonomous agent or an ego vehicle 100 as described with reference to FIG. 1.

The keypoint network 320 may be an encoder-decoder style network. The encoder may include a number of EGG-style blocks, such as four EGG-style blocks, stacked to reduce the resolution (H×W) of the input image. In some examples, the resolution is reduced to H/8×W/8. The reduced resolution may improve keypoint location predictions and descriptor predictions. In this low resolution embedding space, each pixel may correspond to a cell in the input image. In some examples, the cell is an 8×8 cell. The decoder may include three separate heads for the keypoints (e.g., locations), descriptors, and scores, respectively.

As described, in some implementations, as shown in FIG. 3A, the keypoint network 320 may generate a keypoint score 314 associated with each keypoint of an image, respectively. At test time, reliable keypoints may be identified based on an associated keypoint score 314. A subset of the reliable keypoints may be selected for keypoint matching. In some examples, a reliable keypoint may be a keypoint associated with a keypoint score 314 that satisfies a reliability condition, such as having a keypoint score 314 that is greater than a threshold, or a keypoint score 314 within a top percentage of all keypoint scores 314. In some such examples, the reliable keypoints may be selected for matching, such that feature pairs may have consistent keypoint scores. Additionally, during training, the keypoint network 320 may learn to distinguish desirable keypoints based on the keypoint scores 314.

In some implementations, as shown in FIG. 3A, for each pixel of the image 306 and 308 processed by the keypoint network 320, keypoint network 320 outputs a keypoint location 312 relative to the grid, such as the 8×8 grid, corresponding to the respective pixel. For each pixel, the keypoint location 312 may be coordinates of the input image accounting for the grid's position in an embedding of the encoder of keypoint network 320. The keypoint locations may be in relation to the grid, in which case pixel coordinates in the original image may be determined based on known parameters of the grid. Alternatively, the keypoint locations may be pixel coordinates in the original image.

In some implementations, as shown in FIG. 3A, a set of 2D keypoints 316A may be associated with the target image 308 based on the outputs 312 and 314 of the keypoint network 320. Additionally, a set of 2D keypoints 316B may be associated with the query image 306 based on the outputs 312 and 314 of the keypoint network 320. As shown in FIG. 3A, the target image 308 may be localized in a 3D map 304. In some examples, the 2D keypoints 316A of the target image 308 may be used to localize the target image 308 in the 3D map 304 to retrieve the 3D keypoints 318. The 3D map 304 may be pre-built based on previously collected sensor information.

In some other implementations, the 3D keypoints 318 may be obtained from the 3D map 304 estimated by the depth network 310 from the target image 308. In such implementations, the 3D map 304 may be generated from a single image, such as the target image 308. As described below with respect to FIGS. 3B and 3C, the 3D keypoints 318 may be obtained from the 3D map 304 (e.g., depth map) generated by the depth network 310.

In some implementations, as shown in FIG. 3A, the 3D keypoints 318 corresponding to a location of the target image 308 may be input to a graph convolution model 302 (e.g., graph convolution network (GCN)). In addition, the 2D keypoints 316B of the query image 306 may be input to the graph convolution model 302. In such implementations, the graph convolution model 302 matches the 2D keypoints 316B (e.g., features) of the query image 306 with the 3D keypoints 318 (e.g., features) of the 3D map 304. In some examples, the 3D keypoints 318 may be packed together with the 2D keypoints 316B to generate a multi-dimensional vector, such as a five-dimensional (5D) vector. In such examples, the 5D vector may be input to the graph convolution model 302 to identify matching keypoint pairs 330. A matching keypoint pair 330 refers to a 2D keypoint 316B of the query image 306 that matches a 3D keypoints 318 of the 3D map 304. In such examples, the matching may be an example of descriptor-free matching. That is, the keypoints 316B and 318 may be matched by the 3D keypoints 318 based on geometrical information. More specifically, the graph convolution model 302 may place a greater weight on a spatial layout of features and less emphasis on an appearance of features (e.g., keypoints).

Because the matching is descriptor-free, training images may be more similar to testing images, thereby improving a training process. Furthermore, the system may place a greater emphasis on a spatial layout of features as opposed to their appearance. Furthermore, additional degrees of freedom may be included for each keypoint. As such, more information may be used to distinguish dynamic and/or occluded objects. Therefore, the 3D to 2D matching may be more robust in view of changes to appearance, dynamic objects, and/or occluded objects. The GCN may be referred to as a matching network. The matching network may be one component of a system for scene reconstruction and localization.

Aspects of the present disclosure are not limited to localization based on matching 2D keypoints from a query image to 3D keypoints from a pre-built map. In some implementations, the 3D keypoints may be obtained from a target image. In such implementations, the 3D information may be determined via a depth network (e.g., artificial neural network). In such implementations, the keypoint matching may be used for estimating ego motion.

Figure 3B:
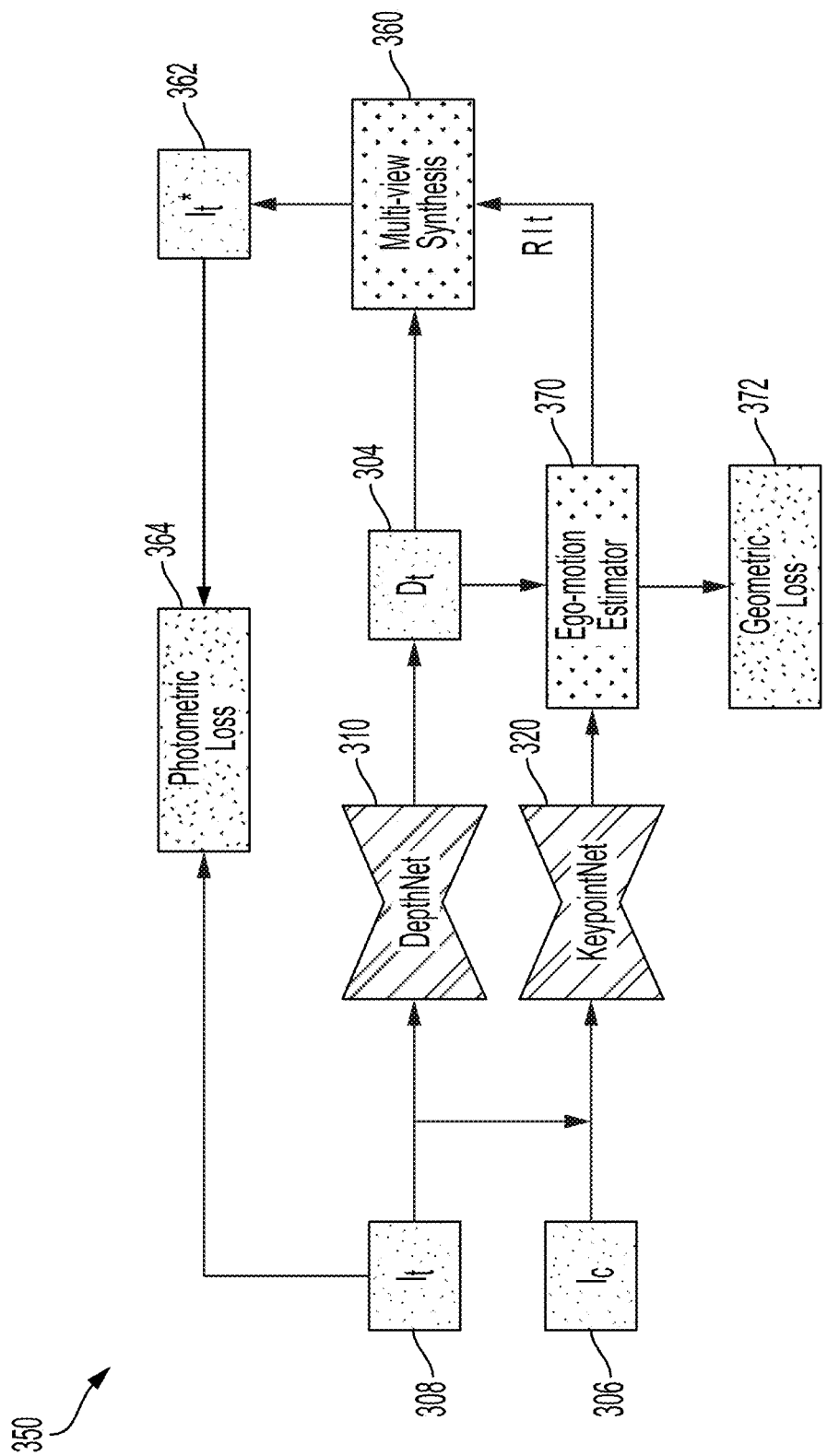
FIG. 3B is a block diagram illustrating a keypoint framework, in accordance with aspects of the present disclosure.

In some such implementations, the ego motion may be estimated based on 3D keypoints 318 determined based on the target image 308. As described in FIG. 3A, in such implementations, the 3D keypoints may be determined based on a 3D map 304 generated by a depth network 310. FIG. 3B is a block diagram illustrating a keypoint matching framework 350 for estimating ego motion, in accordance with aspects of the present disclosure. The keypoint matching model 350 may be an example of a monocular framework. In one aspect of the present disclosure, the keypoint matching model 350 may be used for map building, such as offline map building.

In one configuration, the keypoint matching model 350 receives two consecutive images, a target image ($I_t$) 308 and a context image ($I_c$) 306 of a monocular video. The context image 306 may also be referred to as a query image 306, such as the query image 306 of FIG. 3A. In this configuration, the target image $I_t$ 308 is provided as input to a depth network (DepthNet 310), which outputs a predicted depth map 304 (e.g., $D_t$), and the context image $I_c$ 306 is provided as input to a keypoint network (KeypointNet 320). For example, the DepthNet 310 may be implemented using a ResNet18 encoder followed by a decoder that outputs inverse depth at four scales. The dense depth map 304 may also be referred to as a 3D map, such as the 3D map 304 of FIG. 3A.

In aspects of the present disclosure, two consecutive images (e.g., the target image $I_t$ 308 and the context image $I_c$ 306) are input for self-supervise 3D keypoint learning using the ego-motion estimator 370. In some implementations, the DepthNet 310 and the KeypointNet 320 may be simultaneously trained in an end-to-end process using a combination of the photometric loss block 364, the geometric loss block 372, and the multi-view synthesis block 360. The keypoint matching model 350 provides 3D keypoint estimation for long-term ego-motion estimation using a synthesized target image $I_t^*$ 362.

As shown in FIG. 3B, the keypoint matching model 350 is configured to perform depth-aware keypoint learning purely from watching large volumes of unlabeled videos, without any need for supervision in the form of ground-truth or pseudo ground-truth labels. According to aspects of the present disclosure, this training also learns a 2D-to-3D key-point lifting function, which may estimate the ego-motion between temporally adjacent images.

According to aspects of the present disclosure, monocular depth-aware keypoint learning may be formulated as follows. Given an input monocular image I, keypoint locations p, descriptors f, and scores s may be regressed along with a depth map 304 D. Functionally, three components may be defined in the keypoint matching model 350. Such components may enable depth-aware keypoint learning in an end-to-end differentiable setting. These components include: (i) a keypoint network 320 (KeypointNet)$f_p$:I→k={p, f, s} that learns to regress N output keypoint locations $p \in \mathbb{R}^{2 \times N}$ descriptors $f \in \mathbb{R}^{256 \times N}$ and scores $s \in \mathbb{R}^N$ given an input image $I \in \mathbb{R}^{3 \times H \times W}$; (ii) a depth network 310 (DepthNet) $f_D$:I→D, that learns to predict the scale-ambiguous dense depth map 304 D=$f_D$(I). As a result, the depth network 310 provides a mechanism to lift the sparse 2D keypoints $p \in \mathbb{R}^{2 \times N}$ to 3D by directly sampling from the predicted dense depth 304 D, $p^d = \pi^{-1}(p, D_t(pt))$: and (iii) a fully-differentiable ego-motion estimator $$370 \, f_x(I_c, I_t) = x_{t \to c} = \begin{pmatrix} R & t \\ 0 & 1 \end{pmatrix} \in \mathbb{SE}, \quad (3)$$

that predicts the relative six degrees of freedom (6-DoF) rigid-body transformation between the target image $I_t$ 308 and the context image $I_c$ 306. As described herein, $P_{t \to c}$ denotes the warped keypoints $p_t$ from the target image $I_t$ 308 to the context image $I_c$ 306 via the transformation $x_{t \to c}$.

Aspects of the present disclosure compute the depth at multiple scales during training. Still, when referring to the associated sparse depth for a set of descriptors, the depth from the scale with the highest resolution is used. As should be recognized, in the monocular SfM setting, the depth scale is ambiguous up to an unknown scale factor.

In aspects of the present disclosure, the keypoint matching model 350 leverages geometric transformations to self-supervise and boost keypoint learning by relying on the multi-view synthesis block 360. In one configuration, the multi-view synthesis block 360 leverages epipolar constraints in two-view camera geometry for robust 3D keypoint learning. That is, the multi-view synthesis block 360 may be configured for self-supervised 3D keypoint learning that leverages the structured geometry of scenes in unlabeled monocular videos. For example, computed warped keypoints in the context image 306 (e.g., $I_c$) corresponding to the determined keypoints from the target image (e.g., $I_t$ 308) according to a nearest keypoint in the target image (e.g., $I_t$ 308), as illustrated in FIG. 3C.

Figure 3C:
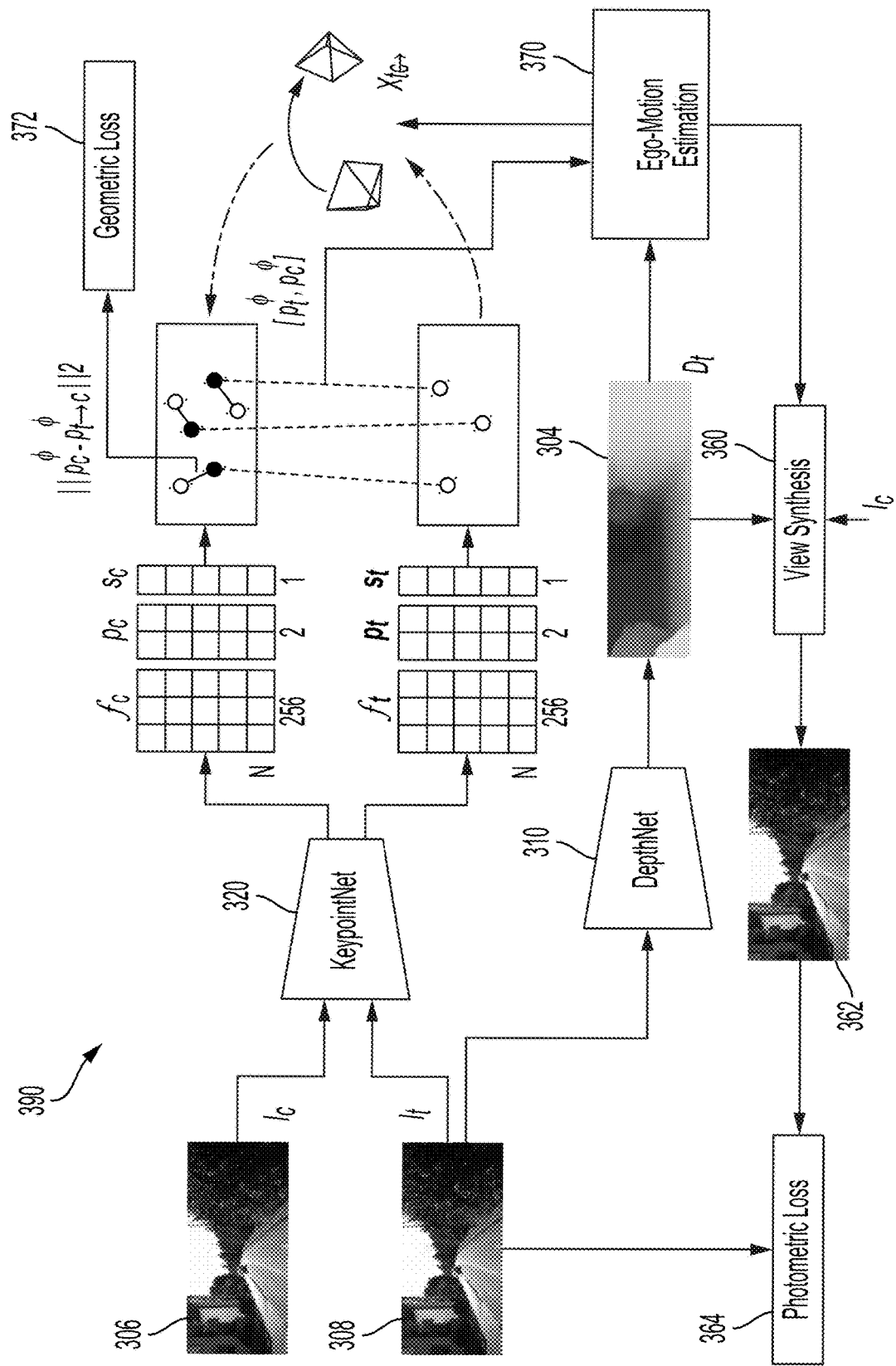
FIG. 3C is a block diagram illustrating an example of monocular structure-from-motion (SfM)-based three-dimensional (3D) keypoint learning, in accordance with aspects of the present disclosure.

FIG. 3C illustrates a monocular structure-from-motion (SfM)-based 3D keypoint learning 390, according to aspects of the present disclosure. The monocular SfM-based 3D keypoint learning 390 provides a comparison between a homographic adaptation and self-supervised depth-aware keypoint learning, according to aspects of the present disclosure. In an adaptation step, a set of corresponding keypoints is computed: $p_t^\Phi \leftrightarrow p_t^*$ (e.g., $p_t^\Phi$ from target image $I_t$ 308 along with $p_c^\Phi$ in the context image $I_c$ 306). In this configuration, predicted descriptors $f_t$ and $f_c$ in the target and context images are used to compute $p_c^\Phi$ via reciprocal matching in a descriptor space. For example, given the set of corresponding keypoints $p_t^\Phi \leftrightarrow p_c^\Phi$, the associated ego-motion $x_{t \to c}$ is computed. Once the associated ego-motion $x_{t \to c}$ is known, the corresponding keypoint $p_t$ is computed using the ego-motion estimator 370. For example, the corresponding keypoint $p_t$ is computed by warping $p_t$ and inducing a combination of dense photometric loss (e.g., photometric loss block 364) via image-synthesis (e.g., multi-view synthesis block 360) and sparse geometric losses (e.g., geometric loss block 372).

In some implementations, for multi-view adaptation, a corresponding keypoint $p_t$ may be computed via re-projection in a monocular two-view setting. This example uses: (i) a dense photometric loss based on the warped projection of the depth map 304 $D_t$ aimed at optimizing the dense depth prediction by the DepthNet 310; and (ii) a sparse geometric loss aimed at minimizing the re-projection error between corresponding keypoints $k_s^d$ and $k_t^d$ predicted by the KeypointNet 320.

As described in further detail below, relative poses of successive images (e.g., the target image $I_t$ 308 and the context image $I_c$ 306) of the monocular video and the depth-aware keypoints are matched based on nearest neighbor matching using the associated descriptors with a reciprocal check.

In the example of FIG. 3C, correspondences $p_t^\Phi \in I_t$ and $p_c^\Phi \in I_c$ may be computed. Based on the computed correspondences $p_t^\Phi \in I_t$ and $p_c^\Phi \in I_c$, a robust estimator is used to compute the 6-DoF rigid body pose transformation $x_{t \to c}$ between the target and context views. In aspects of the present disclosure, pose estimation may be performed by lifting the 2D keypoints from the target image with the associated depth Dt. For example, a perspective-n-point (PnP) process is used to compute an initial relative pose transformation $$x_{t \to s}0 = \begin{pmatrix} R_o & t_o \\ 0 & 1 \end{pmatrix}$$

to geometrically match the keypoints in the target image to those in the context image. Specifically, to reduce:

$$E_\psi(X_{t \to c}^0) = \|p_{t \to c}^* - \pi(X_{t \to c}^0 \cdot P_t^*)\|_2, \quad (1)$$

where $\pi(\cdot)$ is the standard pinhole camera projection model used to project the warped points $(R \cdot p_t^d + t)$ on to the context image $I_c$.

The estimated relative pose $x^0_{t \to c}$ may be obtained by reducing the residual error in Equation 1 using, for example, a Gaussian-Newton (GN) method with robustness to outliers. Reducing the residual error may enable robust pose computation; however, reducing the residual eliminates a differentiable pose with respect to the 3D keypoints used for estimation. To alleviate the elimination of the differentiable pose, the resulting pose estimate can be used as an initial guess to an end-to-end differentiable pose estimation module within the self-supervised 3D keypoint learning framework, as shown in FIG. 3C.

According to aspects of the present disclosure, differentiable pose estimation from 3D keypoints is described based on frame-to-keyframe tracking. In this aspect of the present disclosure, calculating the re-projected context 3D keypoints $p_{t \to c}^\Phi$ from the target keypoints $p_t^\Phi$ via the initial pose estimate $$x_{t \to c}^0 = \begin{pmatrix} R_o & t_o \\ 0 & 1 \end{pmatrix},$$

a 3D residual can be formulated to recover the pose in closed-form:

$$E_{OP}(X_{t \to c}) = \|P_c - X_{t \to c} \cdot P_t\|_2, \quad (2)$$

where $P_t = \pi^{-1}(p_t, D_t(p_t))$, $P_c = \pi(p_s, d_s)$, and $d_c = [X_{t \to c}^0 \cdot P_t]_z$.

The 3D residual in Equation 2 can be reduced by estimating the rotation and translation separately using a closed-form solution on an established inlier set. The rotation is first estimated by subtracting the means of the points and minimizing Equation 3 by solving singular value decomposition (SVD) in closed-form (e.g., the Orthogonal Procrustes problem:

$$E = (\mathcal{R}) = \|P_c^* - R \cdot P_t^*\|_2, \text{ where } P_i^* = P_i - \overline{P}_i, \quad (3)$$

$$U\Sigma V = \text{SVD}(\Sigma(P_c^*)^T(P_t^*)), \text{ where } R = VU^T. \quad (4)$$

Once the rotation R is computed, the translation t can be directly recovered by minimizing:

$$t = p_c^* - \mathcal{R} \cdot P_t^*. \quad (5)$$

Thus, the gradients for the pose rotation and translation can be effectively propagated with respect to the lifted 3D keypoint locations, making the overall pose estimation fully-differentiable. The differentiable pose estimated using the 2D keypoints from the context image and 3D keypoints from the target image couples keypoint and depth estimation. This allows further optimization of both predictions using an overall keypoint learning objective.

Aspects of the present disclosure are directed to self-supervised learning of depth-aware keypoints in a fully end-to-end differentiable manner using a combination of photometric and geometric losses. As shown in FIGS. 3B and 3C, both the KeypointNet 320 and the DepthNet 310 are jointly optimized using the losses described below.

The total keypoint loss is composed of three terms: $\mathcal{L}_{kpn} = \mathcal{L}_{geom} + \beta_1 \mathcal{L}_{desc} + \beta_2 \mathcal{L}_{score}$. Specifically, the total keypoint loss may be based on a geometric loss ($\mathcal{L}_{geom}$). For the geometric loss, using $X_{t \to c}$ and $P_t^\Phi$, the warped keypoints from the target image 308 $I_t$ to the context image 306 $I_c$ may be determined as:

$$p_{t \to c}^* = \pi(X_{t \to c} P_t^\Phi) = \pi(\mathcal{R} \cdot P_t^\Phi + t). \quad (6)$$

The total keypoint loss may also be based on a descriptor loss ($\mathcal{L}_{desc}$). In some examples, the descriptor loss uses nested hardest sample mining to self-supervise the keypoint descriptors between the context image $I_c$ 306 and the target image $I_t$ 308. Given anchor descriptors ft from the target image $I_t$ 308 and their associated positive descriptors in the $f_+ = f_t^{MV}$ in the context image $I_c$ 306, the triplet loss is defined as:

$$L_f = \sum_1 \max(0, \|f, f_+\|_2 - \|f, f_-\|_2 + m), \tag{7}$$

where $f_-$ is the hardest descriptor sample mined from $f_g$ with margin m. The total keypoint loss may be further based on a score loss ($\mathcal{L}_{score}$). In this example, the score loss is introduced to identify reliable and repeatable keypoints in the matching process. In particular, aspects of the present disclosure ensure that (i) the feature-pairs have consistent scores across matching views; and (ii) the network learns to predict high scores for good keypoints with low geometric error and strong repeatability. For example, this objective is achieved by minimizing the squared distance between scores for each matched keypoint-pair, and minimizing or maximizing the average score of a matched keypoint-pair if the distance between the paired keypoints is greater or less than the average distance respectively:

$$\mathcal{L}_{score} = \left[ \frac{(s_t^\phi + s_c^\phi)}{2} \cdot (\|p_{t \to c}^\phi, p_c^\phi\|_2 - \bar{d}) + (s_t^\phi - s_c^\phi)^2 \right], \tag{8}$$

where $s_t^\phi$ and $s_c^\phi$ are the scores of the source and target frames, respectively, and $\bar{d}$ is the average re-projection error of associated points in the current frame, given by $$\bar{d} = \frac{(s_t^\phi + s_c^\phi)}{2}.$$

Here, d refers to the 2D Euclidean distance in feature space between L matching keypoints.

In some implementations, in addition to the geometric losses, a dense photometric loss is used to learn dense depth in the DepthNet 310, for example, by warping the depth of the target image $I_t$ 308 from the depth map $D_t$ 304 along the predicted ego-motion estimate $x_{t \to c}$ to the context image $I_c$, 306 (e.g., context image frame). In addition, a structural similarity (SSIM) loss is imposed between the synthesized target image $I_t^*$ 362 and the original target image $I_t$ 308. The resulting dense photometric loss is regularized with an L1 pixel-wise loss term:

$$\mathcal{L}_{photo}(I_t, \hat{I}_t) = \gamma \frac{1 - SSIM(I_t, \hat{I}_t)}{2} + (1 - \gamma)|(I_t, \hat{I}_t)|. \tag{9}$$

To account for parallax errors and the presence of dynamic objects in videos, the pixel-wise minimum is computed between the set of synthesized context images $I_c \in I_c$ (e.g., context images 306) and the target image $I_t$ 308. In addition, static pixels may be masked out by removing those which have a warped photometric loss $\mathcal{L}_{photo}(I_t, \hat{I}_t)$ higher than their corresponding unwarped photometric loss $\mathcal{L}_{photo}(I_t, I_S)$, calculated using the original context image without view-synthesis. This has the effect of removing pixels with non-changing appearances, including static frames and dynamic objects with no relative motion.

To regularize depth in texture-less low-image gradient regions, an edge-aware term is incorporated:

$$L_{sm} = |\delta_x \hat{D}_t| e^{-|\delta_x I_t|} + |\delta_y \hat{D}_t| e^{-|\delta_y I_t|}. \tag{10}$$

As described above, the depth regressed from the depth map Dt 304 is scale-ambiguous. While recovering scale-consistent depth is not a strict specification for the proposed framework to learn 3D keypoints, scale-consistency is important for tasks that involve accurate ego-motion estimation. In this aspect of the present disclosure, a depth consistency term is incorporated to discourage scale-drift between dense depth predictions in adjacent frames:

$$\mathcal{L}_{const} = \frac{\|D_t(p_t^\phi) - D_c(p_t^\phi)\|}{D_t(p_t^\phi) + D_c(p_t^\phi)}, \tag{11}$$

where $\mathcal{L}_c$ is a sparse loss defined based on the correspondences $p_t^\phi \leftrightarrow p_c^\phi$.

According to aspects of the present disclosure, using the pair of the target image 308 (e.g., $I_t$) and the context image 306 (e.g., $I_c$), the losses noted above are computed. Additionally, homography adaptation (e.g., translation, rotation, scaling, cropping, and symmetric perspective transformation, etc.) is performed starting from the target image 308 (e.g., $I_t$). Additionally, a per pixel Gaussian noise, color jitter, and Gaussian blur may be applied for additional robustness.

FIG. 4 is a diagram illustrating an example of a hardware implementation for a keypoint matching system 400, according to aspects of the present disclosure. The keypoint matching system 400 may be a component of a vehicle, a robotic device, or another device. For example, as shown in FIG. 4, the keypoint matching system 400 is a component of a vehicle 428. Aspects of the present disclosure are not limited to the keypoint matching system 400 being a component of the vehicle 428, as other types of agents, such as a bus, boat, drone, or robot, are also contemplated for using the keypoint matching system 400. In some examples, the keypoint matching system 400 may be referred to as a descriptor-free keypoint matching system.

The vehicle 428 may operate in one or more of an autonomous operating mode, a semi-autonomous operating mode, and a manual operating mode. Furthermore, the vehicle 428 may be an electric vehicle, a hybrid vehicle, a fuel vehicle, or another type of vehicle.

The keypoint matching system 400 may be implemented with a bus architecture, represented generally by a bus 440. The bus 440 may include any number of interconnecting buses and bridges depending on the specific application of the keypoint matching system 400 and the overall design constraints. The bus 440 links together various circuits including one or more processors and/or hardware modules, represented by a processor 420, a communication module 422, a location module 418, a sensor module 402, a locomotion module 426, a navigation module 424, and a computer-readable medium 414. The bus 440 may also link various other circuits such as timing sources, peripherals, voltage regulators, and power management circuits, which are well known in the art, and therefore, will not be described any further.

The keypoint matching system 400 includes a transceiver 416 coupled to the processor 420, the sensor module 402, a keypoint module 408, the communication module 422, the location module 418, the locomotion module 426, the navigation module 424, and the computer-readable medium 414. The transceiver 416 is coupled to an antenna 444.

The keypoint matching system 400 includes the processor 420 coupled to the computer-readable medium 414. The processor 420 performs processing, including the execution of software stored on the computer-readable medium 414 providing functionality according to the disclosure. The software, when executed by the processor 420, causes the keypoint matching system 400 to perform the various functions described for a particular device, such as the vehicle 428, or any of the modules 402, 408, 414, 416, 418, 420, 422, 424, 426. The computer-readable medium 414 may also be used for storing data that is manipulated by the processor 420 when executing the software.

The sensor module 402 may be used to obtain measurements via different sensors, such as a first sensor 406 and a second sensor 404. The first sensor 406 may be a vision sensor, such as a stereoscopic camera or a red-green-blue (RGB) camera, for capturing 2D images. The second sensor 404 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 404, 406.

The measurements of the first sensor 406 and the second sensor 404 may be processed by one or more of the processor 420, the sensor module 402, the keypoint module 408, the communication module 422, the location module 418, the locomotion module 426, the navigation module 424, in conjunction with the computer-readable medium 414 to implement the functionality described herein. In one configuration, the data captured by the first sensor 406 and the second sensor 404 may be transmitted to an external device via the transceiver 416. The first sensor 406 and the second sensor 404 may be coupled to the vehicle 428 or may be in communication with the vehicle 428.

The location module 418 may be used to determine a location of the vehicle 428. For example, the location module 418 may use a global positioning system (GPS) to determine the location of the vehicle 428. The communication module 422 may be used to facilitate communications via the transceiver 416. For example, the communication module 422 may be configured to provide communication capabilities via different wireless protocols, such as Wi-Fi, long term evolution (LTE), 4G, etc. The communication module 422 may also be used to communicate with other components of the vehicle 428 that are not modules of the keypoint matching system 400.

The locomotion module 426 may be used to facilitate locomotion of the vehicle 428. As an example, the locomotion module 426 may control a movement of the wheels. As another example, the locomotion module 426 may be in communication with one or more power sources of the vehicle 428, such as a motor and/or batteries. Of course, aspects of the present disclosure are not limited to providing locomotion via wheels and are contemplated for other types of components for providing locomotion, such as propellers, treads, fins, and/or jet engines.

The keypoint matching system 400 also includes the navigation module 424 for planning a route or controlling the locomotion of the vehicle 428, via the locomotion module 426. The navigation module 424 may override user input when the user input is expected (e.g., predicted) to cause a collision. The modules may be software modules running in the processor 420, resident/stored in the computer-readable medium 414, one or more hardware modules coupled to the processor 420, or some combination thereof.

The keypoint module 408 may include a memory 480. The memory 480 may be integrated with the keypoint module 408 or may be a component of the keypoint matching system 400. The memory 480 may include volatile and/or non-volatile memory. For example, the memory 480 may be read only memory (ROM), programmable ROM (PROM), electronic programmable ROM (EPROM), electronic erasable PROM (EEPROM), flash memory, random access memory (RAM), or other types of volatile or non-volatile memory. Additionally, the RAM may be, for example, synchronous RAM (SRAM), dynamic RAM (DRAM), synchronous DRAM (SDRAM), double data rate SDRAM (DDR SDRAM), enhanced SDRAM (ESDRAM), sync link DRAM, (SLDRAM), direct RAM bus RAM (DRRAM), or other types of RAM.

The keypoint module 408 may work in conjunction with one or more of the memory 480, the processor 420, the communication module 422, the location module 418, the sensor module 402, the locomotion module 426, the navigation module 424, and the computer-readable medium 414 to perform one or more functions described below. The keypoint module 408 may include the keypoint network 320, the depth network 310, and the graph convolution model 302 described with reference to FIGS. 3A, 3B, and 3C. Additionally, in some implementations, the keypoint module 408 performs functions of the keypoint network 320, the depth network 310, and the graph convolution model 302 described with reference to FIGS. 3A, 3B, and 3C.

In some examples, the keypoint module 408 determines a first set of keypoints corresponding to a current environment of the agent. The keypoint module 408 may also determine a second set of keypoints from a pre-built map of the current environment. The keypoint module 408 may still further identify matching pairs of keypoints from the first set of keypoints and the second set of keypoints based on geometrical similarities between respective keypoints of the first set of keypoints and the second set of keypoints.

The keypoint module 408 may also determine a current location of the agent based on the identified matching pairs of keypoints. The keypoint module 408 may control an action of the agent based on the current location. In some other examples, keypoint module 408 may estimate a motion of the agent based on the identified matching pairs of keypoints. A keypoint matching framework, such as the keypoint matching framework 350 of FIG. 3B, may be used for estimating ego-motion. The keypoint module 408 may also control an action of the agent based on the estimated motion. For example, controlling an action of the agent may include altering a route of the agent, setting a new destination, or avoiding a collision.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control (ACC); parking assistance with automated steering; and lane keeping assistance (LKA) type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle (HAV) is an autonomous vehicle that is Level 3 or higher. Accordingly, in some configurations the vehicle 428 may be one of a Level 0 non-autonomous vehicle, a Level 1 autonomous vehicle, a Level 2 autonomous vehicle, a Level 3 autonomous vehicle, a Level 4 autonomous vehicle, or a Level 5 autonomous vehicle.

Figure 5:
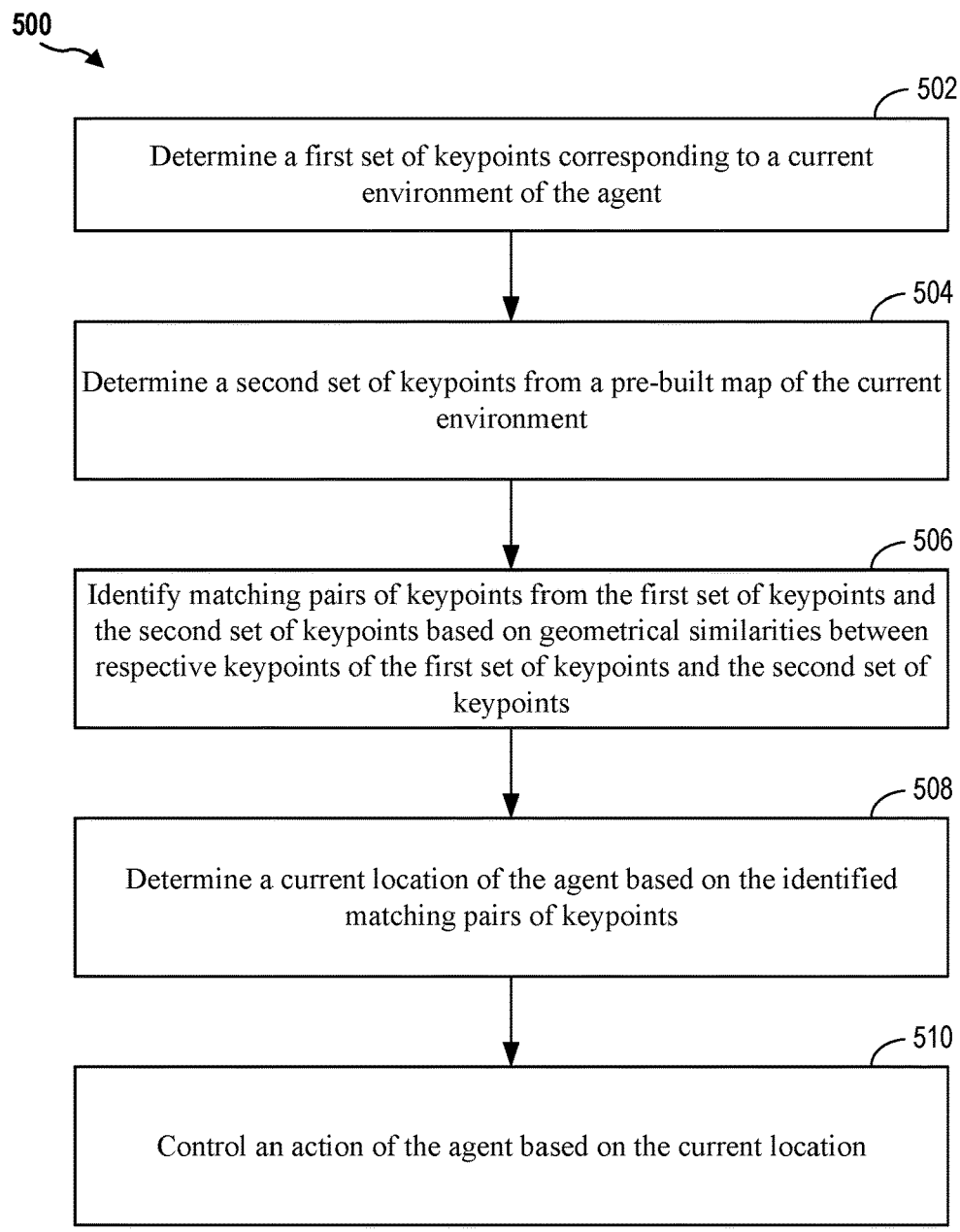
FIG. 5 is a diagram illustrating an example process performed, for example, with a keypoint matching system, in accordance with various aspects of the present disclosure.

FIG. 5 is a diagram illustrating an example process 500 performed, for example, with a keypoint matching system, in accordance with various aspects of the present disclosure. The example process 500 is an example of performing descriptor free keypoint matching between a target image and a query image. In some implementations, the process 500 may be performed by a keypoint matching system, such as the keypoint matching system 300 and 400 described above with reference to FIGS. 3 and 4, respectively. The semantically aware keypoint matching system may be a component of an agent, such as the ego vehicle 100 or the vehicle 428 described above with reference to FIGS. 1 and 6, respectively.

In some implementations, the process 500 begins in block 502 with determining a first set of keypoints corresponding to a current environment of the agent. In block 504, the process 500 includes determining a second set of keypoints from a pre-built map of the current environment. Additionally, in block 506, the process 500 includes identifying matching pairs of keypoints from the first set of keypoints and the second set of keypoints based on geometrical similarities between respective keypoints of the first set of keypoints and the second set of keypoints. In block 508, the process 500 includes determining a current location of the agent based on the identified matching pairs of keypoints. Finally, in block 510, the process 500 includes controlling an action of the agent based on the current location.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for keypoint matching performed by an agent, comprising:
   determining a first set of keypoints corresponding to a current environment of the agent;
   determining a second set of keypoints from a pre-built map of the current environment;
   identifying, via a graph convolutional network associated with the agent, matching pairs of keypoints from the first set of keypoints and the second set of keypoints based on a spatial layout of first features associated with the first set of keypoints and a spatial layout of second features associated with the second set of keypoints, the first features and the second features being included in a multi-dimensional vector;
determining a current location of the agent based on the identified matching pairs of keypoints; and
controlling an action of the agent based on the current location.

2. The method of claim 1, wherein:
the first set of keypoints comprise keypoints generated from a two-dimensional (2D) image of the current environment captured by a sensor integrated with the agent; and
the second set of keypoints comprises keypoints obtained from a three-dimensional (3D) map of the current environment.

3. The method of claim 2, further comprising:
identifying a target image corresponding to the 2D image;
identifying a location of the target image in the 3D map; and
obtaining the keypoints from the 3D map based on the identified location of the target image.

4. The method of claim 1, further comprising generating the multi-dimensional vector based on the first features associated with the first set of keypoints and the second features associated with the second set of keypoints.

5. The method of claim 2, wherein the sensor is a red-green-blue (RGB) camera.

6. The method of claim 1, wherein determining the current location of the agent comprises determining a position of the agent within the 3D map.

7. The method of claim 1, further comprising estimating a motion of the agent based on the identified matching pairs of keypoints.

8. An apparatus for keypoint matching at an agent, comprising:
a processor;
a memory coupled with the processor; and
instructions stored in the memory and operable, when executed by the processor, to cause the apparatus to:
determine a first set of keypoints corresponding to a current environment of the agent;
determine a second set of keypoints from a pre-built map of the current environment;
identify, via a graph convolutional network associated with the agent, matching pairs of keypoints from the first set of keypoints and the second set of keypoints based on a spatial layout of first features associated with the first set of keypoints and a spatial layout of second features associated with the second set of keypoints, the first features and the second features being included in a multi-dimensional vector;
determine a current location of the agent based on the identified matching pairs of keypoints; and
control an action of the agent based on the current location.

9. The apparatus of claim 8, wherein:
the first set of keypoints comprise keypoints generated from a two-dimensional (2D) image of the current environment captured by a sensor integrated with the agent; and
the second set of keypoints comprises keypoints obtained from a three-dimensional (3D) map of the current environment.

10. The apparatus of claim 9, wherein execution of the instructions further cause the apparatus to:
identify a target image corresponding to the 2D image;
identify a location of the target image in the 3D map; and
obtain the keypoints from the 3D map based on the identified location of the target image.

11. The apparatus of claim 9, wherein the sensor is a red-green-blue (RGB) camera.

12. The apparatus of claim 8, wherein execution of the instructions further cause the apparatus to generate the multi-dimensional vector based on the first features associated with the first set of keypoints and the second features associated with the second set of keypoints.

13. The apparatus of claim 8, wherein execution of the instructions to cause the apparatus to determine the current location of the agent further cause the apparatus to determine a position of the agent within the 3D map.

14. The apparatus of claim 8, wherein execution of the instructions further cause the apparatus to estimate a motion of the agent based on the identified matching pairs of keypoints.

15. A non-transitory computer-readable medium having program code recorded thereon for keypoint matching at an agent, the program code executed by a processor and comprising:
program code to determine a first set of keypoints corresponding to a current environment of the agent;
program code to determine a second set of keypoints from a pre-built map of the current environment;
program code to identify, via a graph convolutional network associated with the agent, matching pairs of keypoints from the first set of keypoints and the second set of keypoints based on a spatial layout of first features associated with the first set of keypoints and a spatial layout of second features associated with the second set of keypoints, the first features and the second features being included in a multi-dimensional vector;
program code to determine a current location of the agent based on the identified matching pairs of keypoints; and
program code to control an action of the agent based on the current location.

16. The non-transitory computer-readable medium of claim 15, wherein:
the first set of keypoints comprise keypoints generated from a two-dimensional (2D) image of the current environment captured by a sensor integrated with the agent; and
the second set of keypoints comprises keypoints obtained from a three-dimensional (3D) map of the current environment.

17. The non-transitory computer-readable medium of claim 16, wherein the program code further comprises:
program code to identify a target image corresponding to the 2D image;
program code to identify a location of the target image in the 3D map; and
program code to obtain the keypoints from the 3D map based on the identified location of the target image.

18. The non-transitory computer-readable medium of claim 16, wherein the sensor is a red-green-blue (RGB) camera.

19. The non-transitory computer-readable medium of claim 15, wherein the program code further comprises program code to generate the multi-dimensional vector based on the first features associated with the first set of keypoints and the second features associated with the second set of keypoints.

20. The non-transitory computer-readable medium of claim 15, wherein the program code to determine the current location of the agent further comprises program code to determine a position of the agent within the 3D map.

* * * * *